US007347363B2

(12) United States Patent
Hsieh et al.

(10) Patent No.: US 7,347,363 B2
(45) Date of Patent: Mar. 25, 2008

(54) ANTI-FRAUD APPARATUS AND METHOD FOR CREDIT CARDS

(75) Inventors: Liang-te Hsieh, 8F.-2, No. 36, Mincyuan Rd., Hsinchu City 300 (TW); Wen-hung Chien, 2F, No. 53, Lushui Rd., Hsinchu City 300 (TW); Nan-ting Chiou, Taoyuan (TW)

(73) Assignees: Liang-Te Hsieh, Hsinchu (TW); Wen-Hung Chien, Hsinchu (TW)

( * ) Notice: Subject to any disclaimer, the term of this patent is extended or adjusted under 35 U.S.C. 154(b) by 0 days.

(21) Appl. No.: 11/526,647

(22) Filed: Sep. 26, 2006

(65) Prior Publication Data

US 2007/0272737 A1 Nov. 29, 2007

(30) Foreign Application Priority Data

May 29, 2006 (TW) ............................... 95119068 A

(51) Int. Cl.
*G06K 5/00* (2006.01)

(52) U.S. Cl. ....................................... 235/380; 235/492

(58) Field of Classification Search ................ 235/380, 235/492; 705/17
See application file for complete search history.

(56) References Cited

U.S. PATENT DOCUMENTS 5,259,649 A * 11/1993 Shomron .................... 283/114
6,910,627 B1 * 6/2005 Simpson-Young et al. .. 235/381

* cited by examiner

*Primary Examiner*—Lisa Caputo
(74) *Attorney, Agent, or Firm*—Rosenberg, Klein & Lee

(57) ABSTRACT

An anti-fraud apparatus and a method for recognizing authentic credit cards compares the first six numerals of a credit card number located on a front face thereof (the first six numerals are issued in conformity with coding rules and represent an issuing bank and a grade of the credit card) and the first six small numerals located in a horizontal direction at an upper left portion of a logo on the credit card. The anti-fraud apparatus includes a casing having a pocket for insertion of the credit card and a viewing face corresponding to the pocket. At least a viewing window is disposed on the viewing face and faces an upper left portion of the logo for clearly displaying numerals on the upper left portion. Therefore, cashing operators can accurately and rapidly verify authenticity of the credit card.

14 Claims, 4 Drawing Sheets

ANTI-FRAUD APPARATUS AND METHOD FOR CREDIT CARDS

BACKGROUND OF THE INVENTION

1. Field of the Invention

The present invention relates to an anti-fraud apparatus and method for credit cards, and particularly to an apparatus and method for rapidly and effectively recognizing authenticity of credit cards having an identifying logo such as VISA, in order to provide safety of use and prevent credit card fraud's illegal use.

2. Related Art

With consumer spending patterns changed, credit cards are very popular in shopping. According to the statistics, each of the credit card users may have more than one credit card and at least one VISA credit card. Members of VISA are separated worldwide in more than 150 countries, and over 1.3 billion people use Visa credit cards. Credit cards provide the function that transactions can be paid without cash. However, a serious problem to card issuing banks is the forged card problem. Card forgers are organized in globalization and have a mature skill in forging credit cards. They can forge every feature of a real VISA credit card and can illegally get real VISA credit card information by colluding a banker to get information of the credit card or by colluding a manufacturer to make a lot of forged credit cards, which leads to lost huge money in transaction.

Nowadays, there are many ways to prevent illegal use of VISA credit cards. Cashing operators rely on conventional methods to recognize the reality of VISA credit cards, but it is difficult to successfully recognize what differences are between forged VISA credit cards and real VISA credit cards. In other words, card forgers, first, bulkily forge VISA credit cards of same anti-fraud features like real VISA credit cards including the same color and the same graphic designs on the front face, but no card numbers on the front face neither cardholder's information is not forged on the rear face; moreover, card forgers further get card information by illegally recording a real VISA credit cards; the card information is recorded in a magnetic strip on the rear face of the credit card including a related card number, identification name, expiration dates, and other requiring identification codes. Then, card forgers copy the information on the front and rear faces of the forged VISA credit cards. However, information recorded in such forged VISA credit card does not match the representing cover of the card itself; for instance, information belongs to issuing bank A is recorded in a credit card released by issuing bank B. As a result, cashing operators are hard to recognize a VISA credit card by whatever features shown through fluorescence or comparison between real and fake card numbers. Obviously, conventional anti-fraud methods focus on single comparison (card number) by same features in every VISA credit card (The graphic designs). Therefore, conventional anti-fraud methods cannot effectively recognize a real VISA credit card because card forgers have a mature skill in forging credit cards. So, probability of success in illegally using forged credit cards is still very high.

SUMMARY OF THE INVENTION

Accordingly, an object of the present invention is to provide an improved anti-fraud apparatus and a method for effectively and rapidly recognizing real VISA credit cards whereby to provide safe use and prevent credit card fraud in transaction.

Another object of the present invention is to provide an anti-fraud apparatus having an actuation device for connecting and triggering a credit card machine, which can impel operators verifying real VISA credit cards. Namely, the actuation device connects and triggers card issuing banks only when a VISA credit card is inserted in the present invention; thus cashing operators will naturally verify the VISA credit card during transaction and decide whether to continue the transaction.

To achieve the above-mentioned objects, a method for recognizing real VISA credit cards is used by comparing first six numerals of card number of a VISA credit card located on a front face thereof and first six small numerals located in horizontal direction at an upper left portion of a VISA logo, in which two groups of the first six numerals correspond to each other. Or, for some card issuing banks, the fifth and sixth small numerals are replaced by alphabets. For example: CC (refer to Credit Classic), CG (refer to Credit Gold), CB (refer to Credit Business), AC (refer to Account Classic), AG (refer to Account Gold), DC (refer to Debit Classic), DG (refer to Debit Gold), which represent a code of the issuing bank and a grade of the VISA credit card. Therefore, the other way to recognize real VISA credit cards is to compare first four numerals of card numbers of the VISA credit card located on a front face thereof and first four small numerals located in horizontal direction at an upper left portion of a VISA logo and the fifth and sixth alphabets of the card number of VISA credit card must correspond to the code of the issuing bank and the grade of the VISA credit card as well.

For some card issuing banks, the fifth and sixth small numerals are replaced by alphabets. For example: CC (refer to Credit Classic), CG (refer to Credit Gold), CB (refer to Credit Business), AC (refer to Account Classic), AG (refer to Account Gold), DC (refer to Debit Classic), DG (refer to Debit Gold) which represent a code of the issuing bank and a grade of the VISA credit card. Therefore, the fifth and sixth alphabets must correspond to the code of the issuing bank and the grade of the VISA credit card as well.

In accordance with the above-mentioned method, the present invention is to provide an anti-fraud apparatus, whose feature is that it has a viewing means. The viewing means is used to magnify first six small numerals located in horizontal direction at an upper left portion of a VISA logo in order to clearly compare first six numerals of card numbers on a front face of the VISA credit card.

Another feature of the present invention is that the anti-fraud apparatus further includes an actuation device having actuating circuits and a trigger. The actuating circuits interlink circuits of a credit card machine and an issuing bank (all circuits are transmitted by telephone line). The trigger is disposed in the anti-fraud apparatus where can recognize the VISA credit card for triggering the actuating circuits. Accordingly, when the VISA credit card is appropriately being inserted, the trigger is triggered and therefore actuates the actuating circuits to interlink the credit card machine and the issuing bank. Consequently, cashing operators can verify the VISA credit card and decide whether to continue the transaction.

DESCRIPTION OF THE PREFERRED EMBODIMENTS

Figure 1:
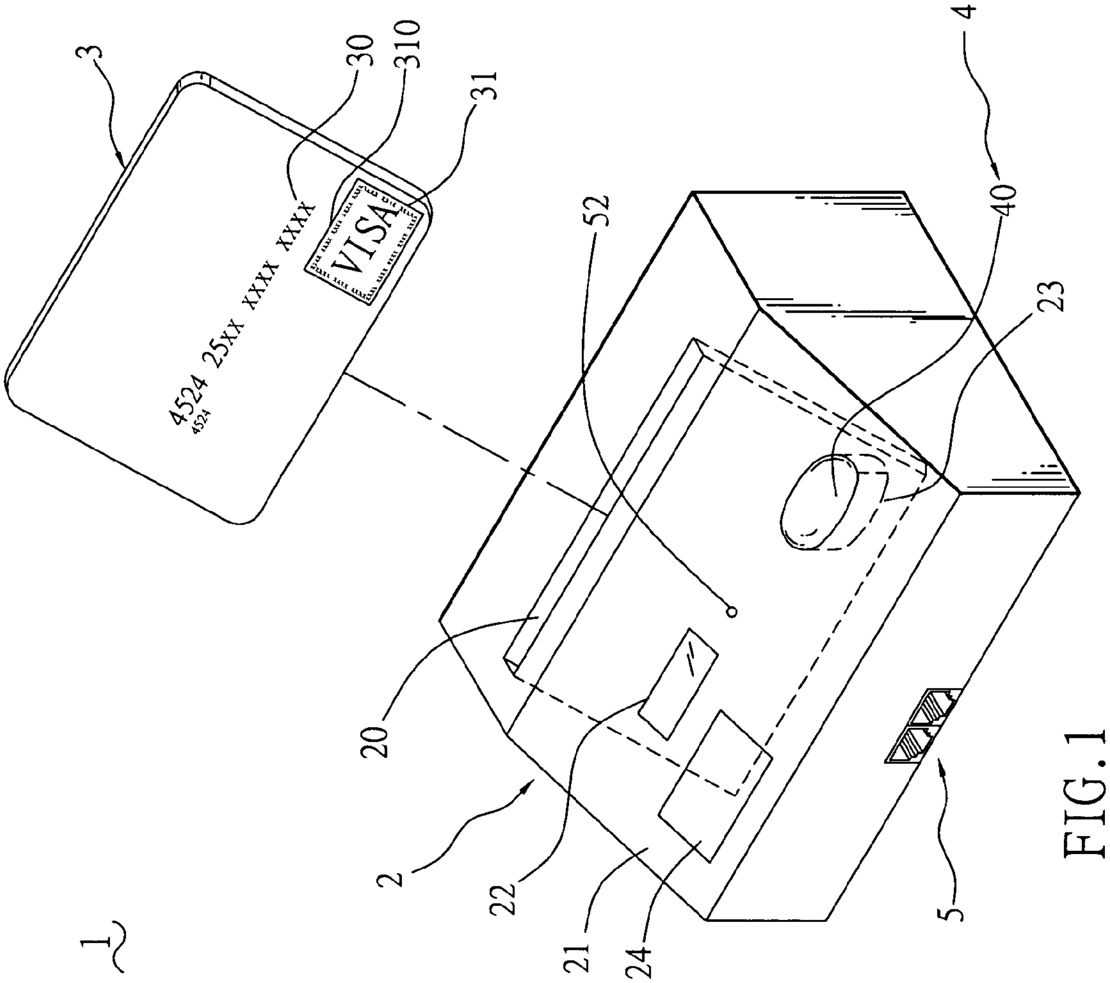
FIG. 1 is an exploded view of an anti-fraud apparatus for credit cards and a VISA credit card of the present invention.
Figure 2:
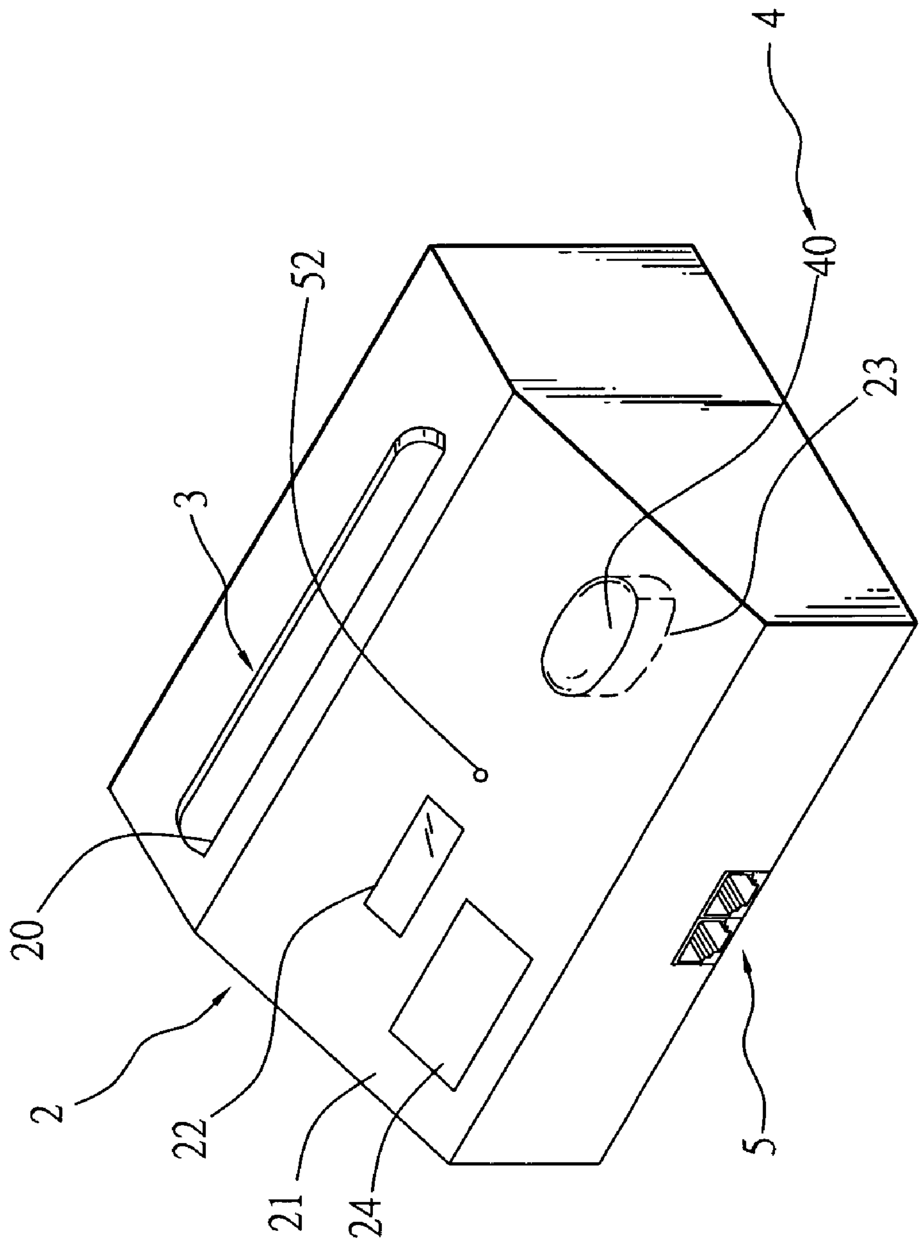
FIG. 2 is an assembled view illustrating the VISA credit card being inserted in the anti-fraud apparatus.

Referring to FIGS. 1 and 2, an anti-fraud apparatus 1 for recognizing authentic, or real, credit cards having an identifying logo such as VISA of the present invention includes a casing 2 having a pocket 20 slantwise disposed thereon (as broken lines shown in FIG. 1) for allowing insertion of the VISA credit card 3. A viewing face 21 of the casing 2 is inclined to the slant pocket 20 for facilitating viewing. A first viewing window 22 and a second viewing window 23 are disposed on the viewing face 21, wherein the first viewing window 22 face first six numerals of card numbers of VISA credit card on a front face of the VISA credit card 3, and the second viewing window 23 face six small numerals located in a horizontal direction at an upper left portion 310 of a VISA logo 31 on the front face of the VISA credit card 3. Comparing two groups of the first six numerals through the first viewing window 22 and the second viewing window 23 the authenticity of the VISA credit card 3 may be recognized. That is, the first six numerals displayed through the first viewing window 22 may be is totally the same as the first six small numerals displayed through the second viewing window 23, or in another situation, the first four numerals displayed through the first viewing window 22 may be the same as the first four small numerals displayed through the second viewing window 23, while the and moreover, a fifth and sixth numerals are actually alphabet characters which follow the four small numerals and correspond to a code of an issuing bank and a grade of the VISA credit card 3.

Further referring to FIG. 1, a label 24 is attached to the viewing face 12, on which definition of the fifth and sixth alphabets are indicated, the fifth and sixth alphabets, for example, CC (Refer to Credit Card), CG (Refer to Credit Gold), CB (Refer to Credit Business), AC (Refer to Account Credit), AG (Refer to Account Gold), DC (Refer to Debit Classic), DG (Refer to Debit Gold) which represent the code of the issuing bank and the grade of the VISA credit card 3, the grade generally classified as regular card, golden card, platinum card. As a result, the definition of the fifth and sixth alphabets on the label 24 can help cashing operators recognize the VISA credit card 3.

Moreover, the second viewing window 23 is equipped with a viewing means 4. The view means 4 is a magnifier for magnifying the small numerals located at the upper left portion 310 of the VISA logo 31 on the front face of the VISA credit card 3 and therefore can facilitate viewing the small numerals. In this embodiment the magnifier is a convex lens 40.

Figure 3:
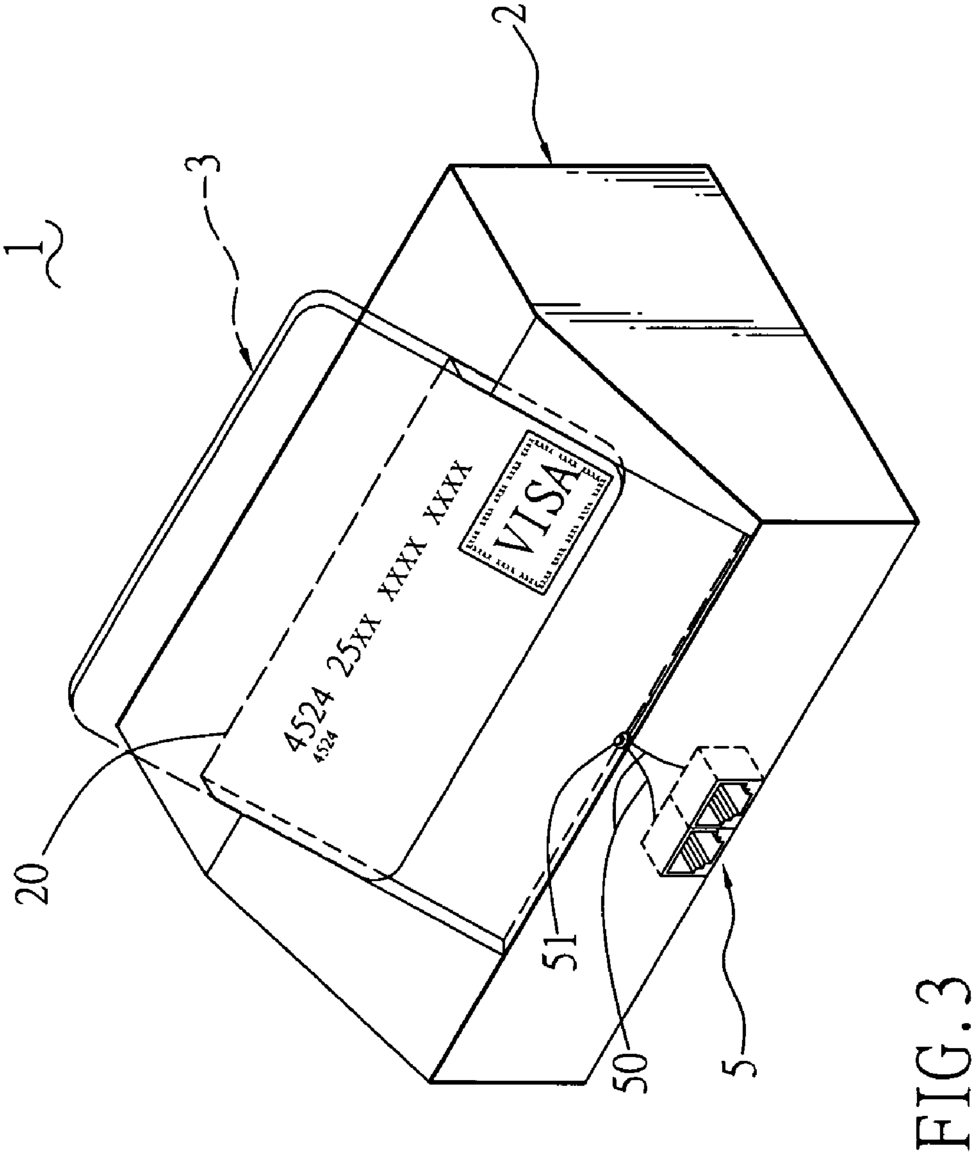
FIG. 3 is a partial cross-sectional view of the present invention.

Referring to FIG. 3, the anti-fraud apparatus of the present invention 1 further includes an actuation device 5 disposed on the casing 2 for connecting and triggering a credit card machine (not shown). The actuation device 5 includes actuating circuits 50 and a trigger 51, wherein the actuating circuits 50 connects to the credit card machine, and the trigger 51 is disposed in a bottom of the pocket 20 of the casing 2 for triggering the actuating circuits 50. Actuated by the trigger 51, the actuating circuits 50 further triggering the credit card machine at the same time. The actuating circuits 50 are in a state of normally open before being actuated, and the trigger 51 is a micro switch. The actuation device 5 further includes a lighting member 52 which connects with the actuation circuits 50 for indicating whether the actuation circuits 50 are triggered. Accordingly, both the actuation circuits 50 and the lighting member 52 are simultaneously triggered by the trigger 51. The lighting member 52, for example, is a light emitting diode (LED), which can reflect light into the pocket 20 and make the numerals to be clearly displayed.

Figure 4:
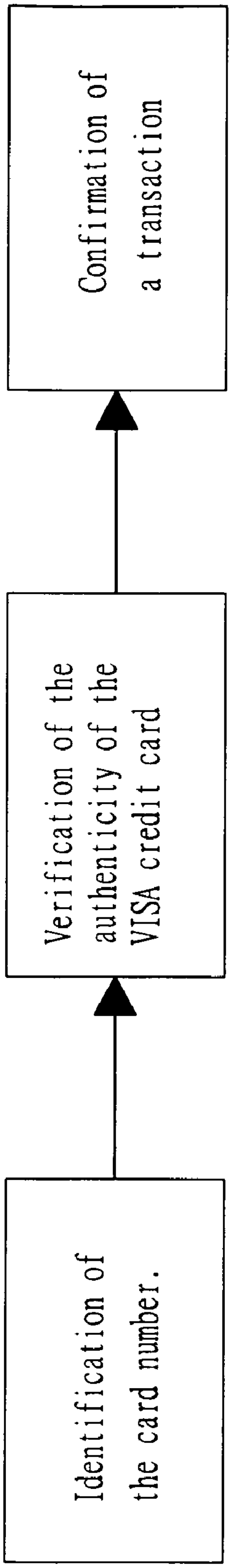
FIG. 4 is a block diagram of the flowing processes of recognizing the VISA credit card through the present invention.

Referring to FIG. 4, flowing processes of recognizing the VISA credit card 3 through the present invention includes the following processes: 1. Identification of the card number. 2. Verification of the reality of the VISA credit card 3. 3. Confirmation of a transaction. At the first step, a cashing operator swipes the card 3 through the credit card machine to identify the card number, and then insert the card 3 into the pocket 20 of the casing 2. After the card 3 is inserted against the trigger 51, the actuation circuits 50 is triggered and therefore connects the card read to a computer (not shown) of the issuing bank. The cashing operator can view the numerals disposed on the front face of the card 3 through the first and second viewing window 22, 23 in order to recognize the real VISA credit card 3, that is, the numerals displayed through the first viewing window 22 correspond to the small numerals displayed through the second viewing window 23. Then the cashing operator can complete the transaction. If the two groups of the numerals do not correspond to each other, the cashing operator can stop the dealing before the transaction being completed.

Consequently, forged VISA credit cards are easily to be recognized by using the apparatus 1 of present invention. The present invention takes advantage of defect of the processes of making forged VISA credit card that card forgers just can make a great lot of forged VISA credit cards with every feature like real VISA credit card including the same front face, the same design, and the same embossed seal and fluorescent mark, and get information which was illegally recorded from the cardholder of real VISA credit card, but they can not fabricate the card number of real VISA credit card on the VISA logo of forged VISA credit card later. Therefore, for forged VISA credit card, first six numerals of card number of VISA credit card and first six small numerals at an upper left portion of a VISA logo always do not correspond to each other. The present invention compare the two groups of the first six numerals correspond to each other, and can be able to effectively and rapidly recognizing real VISA credit cards.

Moreover, cashing operators will verify the VISA credit card 3 with more positive attitude than before because the VISA credit card 3 must be inserted into apparatus 1 of the present invention before a transaction is completed.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A method for recognizing authentic credit cards, particularly to credit cards having an identifying logo, by comparing first six numerals of card numbers located on a front face of a credit card having the identifying logo and first six small numerals located in a horizontal direction at an upper left portion of the identifying logo on the front face; wherein the first four numerals of card numbers on the front face of the credit card are the same as the first four small numerals located in a horizontal direction at the upper left portion of the identifying logo, and the fifth and sixth numerals of the six small numerals at the upper left portion of the identifying logo are replaced by alphabet characters corresponding to a grade of the credit card in conformity to surfaces of the credit card.

2. The method for recognizing authentic credit cards according to claim 1, wherein the alphabet characters represent a code of an issuing bank and a grade of the credit card, the grade selectively indicating a classification including at least one of a regular card, a gold card, and a platinum card; whereby the alphabet characters enable cashing operators to recognize the surfaces of the credit card.

3. The method for recognizing authentic credit cards according to claim 2, wherein the alphabet characters include at least one of: CC (Credit Card), CG (Credit Gold), CB (Credit Business), AC (Account Credit), AG (Account Gold), DC (Debit Classic), and DG (Debit Gold).

4. A method for recognizing authentic credit cards, particularly to credit cards having an identifying logo, by comprising first six numerals of card numbers located on a front face of a credit card having the identifying logo and first six small numerals located in a horizontal direction at an upper left portion of the identifying logo on the front face; wherein the first six numerals of card numbers on the front face are the same as the six small numerals disposed in a direction at the upper left portion of the identifying logo.

5. An anti-fraud apparatus for credit cards and particularly to recognize authentic credit cards having an identifying logo, comprising:

a casing having at least one pocket thereon for allowing insertion of a credit card having an identifying logo; and at least one viewing window disposed on a viewing face of the casing and facing an upper left portion of the identifying logo on a front face of the credit card, the viewing window equipped with a viewing means, wherein the viewing means is a magnifier for magnifying numerals located at the upper left portion of the identifying logo on the front face of the credit card.

6. An anti-fraud apparatus for credit cards and particularly to recognize authentic credit cards having an identifying logo, comprising:

a casing having at least one pocket thereon for allowing insertion of the credit card having an identifying logo;

two viewing windows disposed on a viewing face thereof, wherein a first viewing window faces card numbers disposed on a front face of the credit card, and a second viewing window faces an upper left portion of a the identifying logo on a front face of the credit card, the second viewing window equipped with a viewing means; and, an actuation device disposed on the casing for connecting and triggering a credit card machine.

7. The Anti-fraud apparatus for credit cards according to claim 6, wherein the actuation device includes actuating circuits and a trigger, the actuating circuits connecting to the credit card machine, and the trigger disposed in the pocket of the casing for triggering the actuating circuits.

8. The Anti-fraud apparatus for credit cards according to claim 7, wherein the actuating circuits are in a state of normally open, and the trigger is a micro switch.

9. The Anti-fraud apparatus for credit cards according to claim 7, wherein the actuation device further comprises a lighting member connecting with the actuation circuits, both the actuation circuits and the lighting member simultaneously triggered by the trigger.

10. The Anti-fraud apparatus for credit cards according to claim 9, wherein the lighting member is a light emitting diode (LED).

11. The Anti-fraud apparatus for credit cards according to claim 6, wherein the viewing means is a magnifier for magnifying numerals located at the upper left portion of the identifying logo on the front face of the credit card.

12. The Anti-fraud apparatus for credit cards according to claim 6, wherein the viewing means is a convex lens.

13. The Anti-fraud apparatus for credit cards according to claim 6, wherein the pocket is disposed slantwise on the casing, and the viewing face of the casing is inclined to the slant pocket for facilitating viewing the first and the second viewing windows.

14. The Anti-fraud apparatus for credit cards according to claim 6, wherein a label is attached to the casing, on which definition of a fifth and sixth alphabets characters located at the upper left portion of the identifying logo on the front face of the credit card are indicated, the fifth and sixth alphabets characters representing an issuing bank and a grade of the credit card, the grade generally classified as at least one of a regular card, a golden card, and a platinum card.

* * * * *